UNITED STATES PATENT OFFICE.

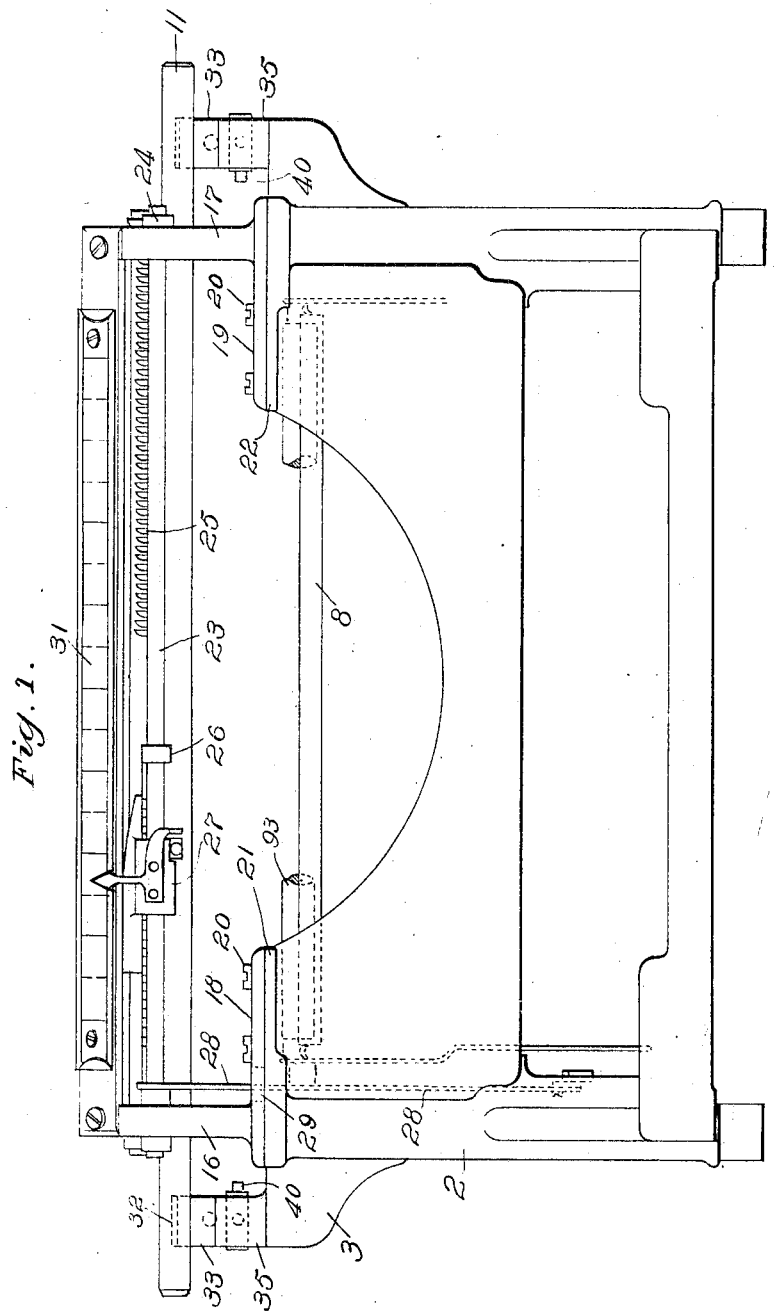

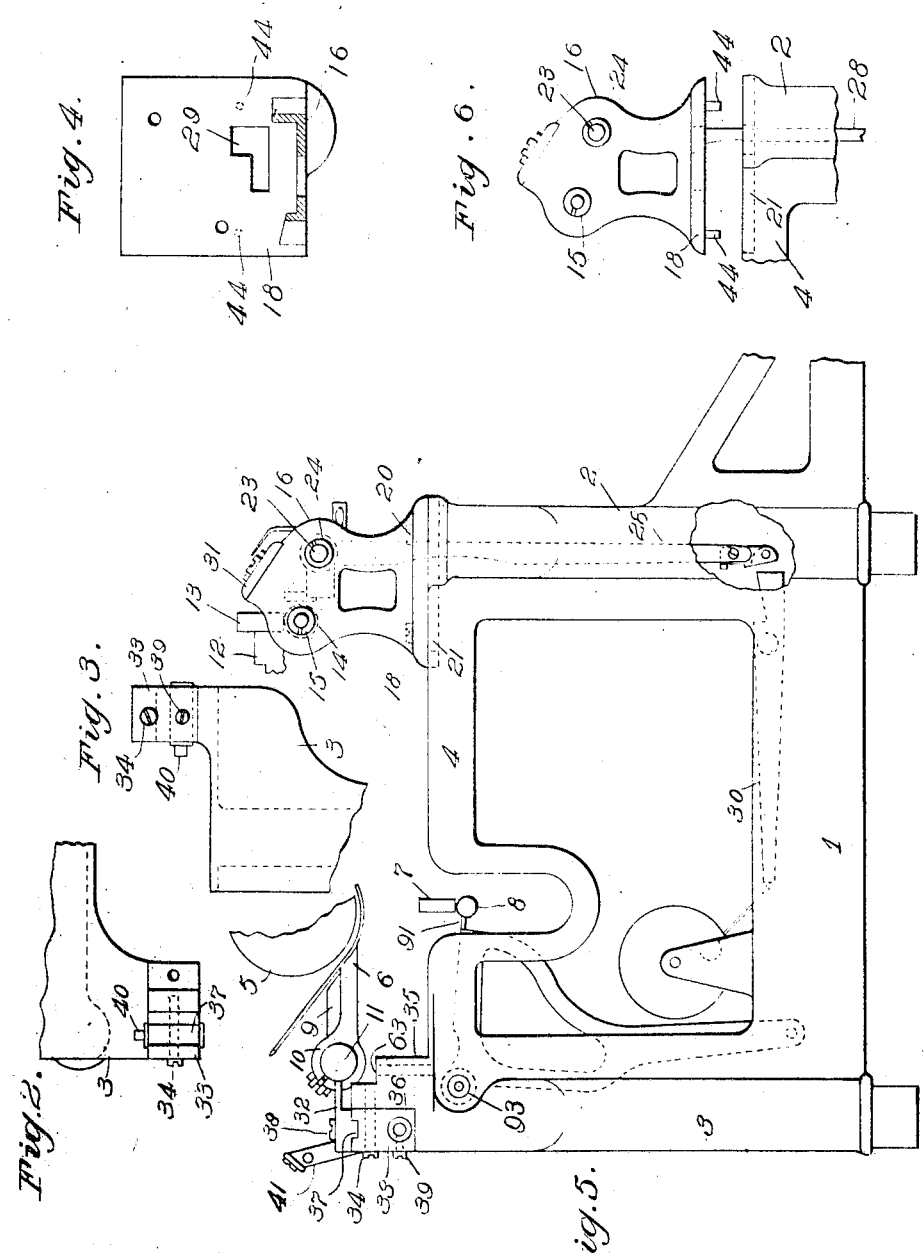

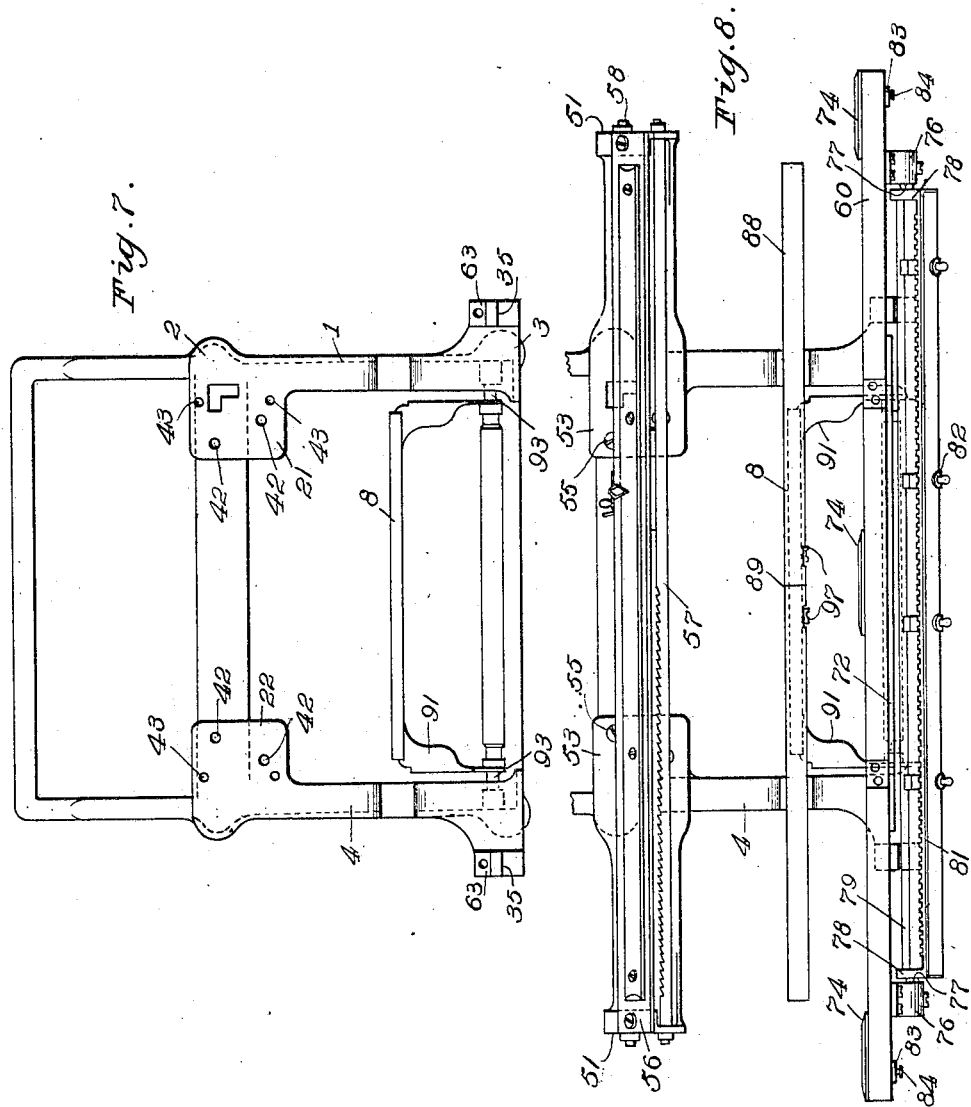

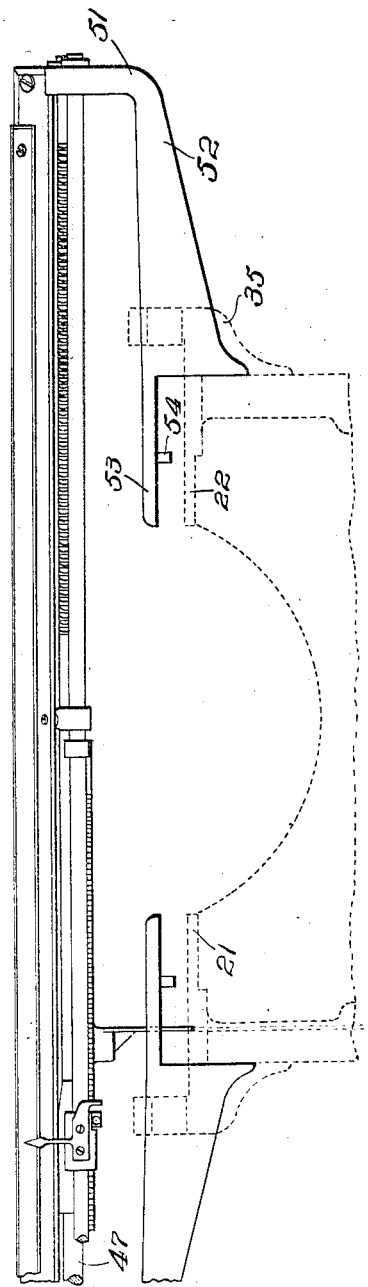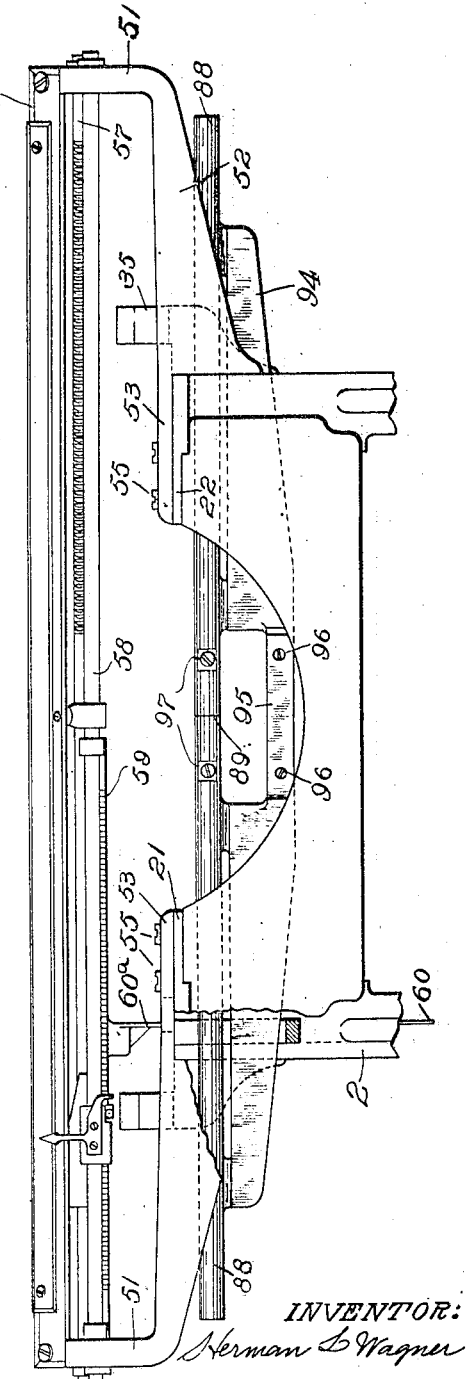

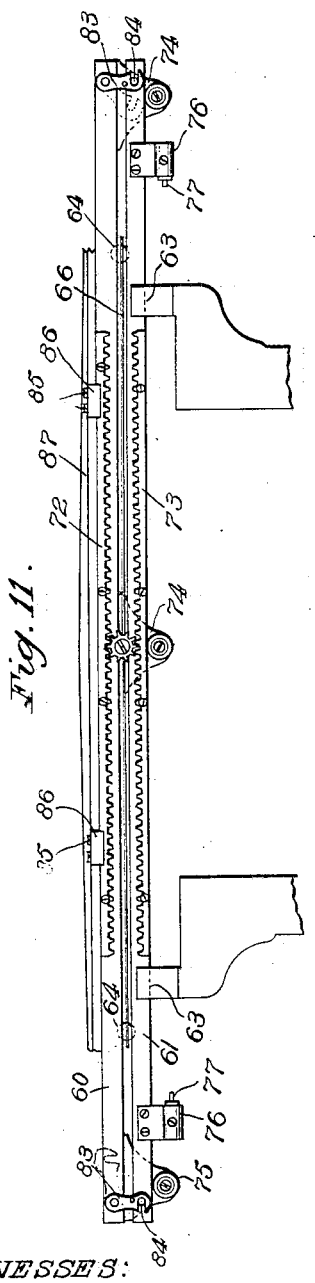

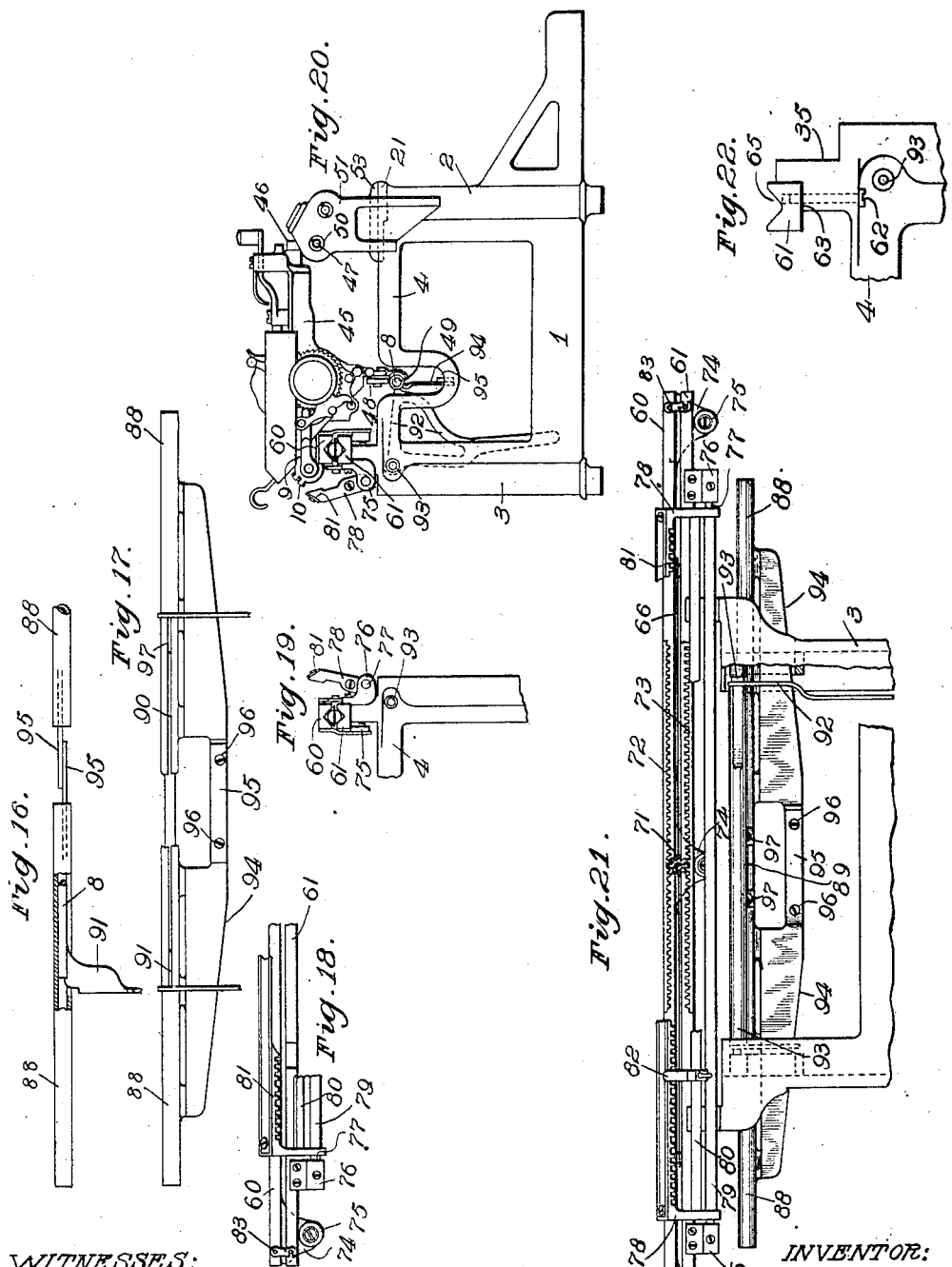

HERMAN L. WAGNER, OF MOUNT VERNON, NEW YORK, ASSIGNOR TO UNDERWOOD TYPEWRITER COMPANY, OF NEW YORK, N. Y., A CORPORATION OF NEW JERSEY.

TYPE-WRITING MACHINE.

946,814.

Specification of Letters Patent. Patented Jan. 18, 1910.

Application filed January 23, 1908. Serial No. 412,257.

*To all whom it may concern:*

Be it known that I, HERMAN L. WAGNER, a citizen of the United States, residing in Mount Vernon, in the county of Westchester and State of New York, have invented certain new and useful Improvements in Type-Writing Machines, of which the following is a specification.

This invention relates to the main frames, paper carriages and case-shift mechanisms of typewriting machines, particularly those of the front strike class, and more especially to the well known Underwood writing machine.

There is frequent demand for typewriting machines having extra wide carriages, and in manufacturing the Underwood machines heretofore, it has been the practice to build the main frame for either an ordinary carriage or an extra wide carriage, as the case might be. This involves the necessity of carrying two stocks of main frames, and makes it impossible to change a wide carriage machine to an ordinary carriage machine or vice versa.

The principal object of my invention is to make it practicable to use the same main frame for either wide or ordinary carriages, so that only a single stock of main frames need be manufactured and carried, and so that the machine may at any time be readily changed from an ordinary carriage to a wide carriage machine.

In carrying out my invention, I provide interchangeable short and long front rails and supports, interchangeable short and long rear rails and supports, and interchangeable shift rails, and I also make certain changes in the wide carriages to adapt them to the interchanging system.

The ordinary or short carriages are usually provided each with a single front roll. I provide a single front roll upon the wide carriage also, and I also provide a ball track or rail at the rear of the long carriage. In order to prevent tipping up of either end of the long carriage, I provide wheels at the rear thereof to run upon the under side of the rear rail, these wheels at such intervals that at least two are always working. Each of the long and short front rails is mounted upon standards, which have similar feet or bases to be secured upon seats provided upon the main frame. The short rear rail is of the usual cylindrical type and engaged by the usual eyes on the carriage. This rear rail, however, is mounted upon detachable blocks, and the latter carry a long rocking frame which carries the column stops of the usual tabulating mechanism. The blocks and platen frame are detachable together from the main frame and interchangeable with a long bottom rail or ball track for a long carriage, said track having ears or bearings on which is hinged the long frame carrying a long column-stop bar.

I provide a short platen-shift rail for the short carriage and a long shift rail for the wide carriage. Preferably, the long rail is made tubular or hollow, and is divided into sections that will slip or telescope upon the short rail, so that in changing from a short carriage to a wide carriage it is only necessary to slip these sections upon the shift rail, without other change in the platen-shifting mechanism.

The entire system of main frame and interchangeable parts is such that main frames, containing complements of type systems and other mechanism, may be made up and carried in stock, and either long or short carriages may be fitted thereto as required; or changes from long to short carriages or vice versa may be made at any time after the machine is delivered to the typewriter sales establishment or to a customer.

In the accompanying drawings, Figure 1 is a front elevation of a main frame of an Underwood machine equipped with short front rail, rear rail and shift rail, for use with a short or ordinary carriage. Fig. 2 is a plan, and Fig. 3 a rear elevation to illustrate the manner of securing the detachable blocks upon which the short rear rail is mounted. Fig. 4 is a plan of the left hand seat for the standard of the front rail. Fig. 5 is a side elevation of the machine shown at Fig. 1. Fig. 6 illustrates the manner of attaching or detaching the front rail seen at Fig. 5. Fig. 7 is a plan of the machine frame stripped, that is, ready to receive either a wide or a short carriage. Fig. 8 is a plan illustrating long front and rear rails and shift rail to receive the wide carriage. Fig. 9 is a front elevation of a long front rail, showing the manner of removing or attaching the same to the machine frame. Fig. 10 is a front elevation of a long front rail and shift rail in position upon the machine. Fig. 11 is a rear elevation of the ball tracks for the long carriage, showing also the ball spacer or controller. Fig. 12 is a plan illustrating the ball-controller. Fig. 13 is an end elevation of a ball track seen at Fig. 11. Figs. 14 and 15 are details of means for mounting a pinion upon the ball-controlling bar. Fig. 16 is a sectional plan, and Fig. 17 a rear elevation illustrating the telescopic shift rails. Fig. 18 is a rear elevation of one end of a long rear carriage track. Fig. 19 is an end elevation thereof. Fig. 20 is a side elevation of the machine frame provided with the long carriage. Fig. 21 is a rear elevation of the rear portion of the machine frame provided with long rear and shift rails. Fig. 22 is a detail to illustrate the method of mounting the rear lower ball track upon the machine frame.

The main frame comprises a rectangular base 1, front and rear corner-posts 2, 3, and upper framework 4, all usually cast in one piece. A platen 5 is usually mounted upon a shifting frame 6 having a roll 7 to run upon a shift rail 8, said shifting frame being mounted upon a carriage 9 having ears 10 to slide upon a rear rail 11. The carriage also has a front bar 12 having a roll 13 to run upon a front rail 14. Said front rail is secured by nuts 15 in a pair of standards 16, 17 having bases 18, 19, detachably secured by screws 20 upon plate-like seats 21, 22 formed or provided upon the front upper portion of the machine frame. Said standards or supports 16, 17 are secured together by means of said rail and said nuts 15, and also by means of a rod 23 and nuts 24, said rod having teeth 25, for the usual margin gage, and carrying a rocking frame 26 for the usual line-locking tappet 27, said rocking frame having an arm 28 passing down through an aperture 29 in the base 18 to operate the bell-striking arm 30. Secured upon the standards 16, 17 is also a front scale bar 31 for the usual carriage and margin gage indexes.

The rear rail 11 is of the usual construction, so that no change may be made in the manufacture of the ordinary or short carriage. Said rail is mounted by means of ears 32 upon blocks 33, the latter held by screws 34 upon the rear sides of lugs 35 cast upon the rear of the main frame; said lugs formed with seats 36 for the blocks 33, and the ears 32 having tongue-and-groove joints 37 with the blocks 33 and secured thereto by screws 38.

Secured by screws 39 in the lower portions of the blocks 33 are opposite pintles 40 upon which is hinged a rocking frame 41 to carry the usual column stops of the tabulating mechanism. Except for its length, this rocking frame is similar to the long rocking frame hereinafter described. The screws 34 may be loosened and the blocks 33 taken off, together with the rail 11 and the rocking frame 41; and said long rocking frame may then occupy the space taken up by the removed blocks, it being too long to be confined between the lugs 35, to the rear of which said blocks were secured. When the short front and long rails are removed, the frame has the appearance seen at Fig. 7, the front seats having threaded holes 42 for the screws 20, and also holes 43 to receive dowel pins 44; Fig. 6.

As seen at Fig. 20, the long carriage 45 has a roll 46 to run along the front rail 47, a roll 48 to run upon the long shift rail 49, and a long rear guiding track, which will presently be described. The front rail 47 is secured by nuts 50 upon standards 51 carried upon outer ends of arms 52 projecting oppositely from the main frame and having bases or plates 53 provided with dowels 54 to fit in the holes 43, and also secured by means 55 upon the seats 21, 22. Said standards 51 are also connected by a scale bar 56, a margin gage rod 57 and a rod 58, which carries a hinged rack 59 of the bell-ringing and line-locking mechanism, an arm 60ª depending from said hinged rack corresponding to said arm 28.

The wide carriage is guided by means of upper and lower ball tracks 60, 61, the former secured or formed upon the rear bar of the carriage, and the lower attached by screws 62, Fig. 22, to the lugs 35, the latter having in their top forward portions seats 63 for said track or rail 61. Balls 64, running in grooves 65 in said tracks, are connected by a spacer bar 66, which is formed midway of its ends with incisions 67, 68, and bent to form an opening 69, Fig. 15, in which is rigidly held an arbor 70, upon the projecting end of which turns a pinion 71 meshing with upper and lower racks 72, 73, the former upon the traveling track 60 and the latter upon the stationary track 61, whereby the balls 64 are controlled.

From the front side of the track 60 depend three ears 74 carrying rolls 75 to run upon the under side of the track 61. One of said rolls is in the middle of the carriage, and the others are at the extreme ends thereof, and so placed that at least two of them are constantly running upon said track, so that neither end of the carriage can be accidentally tipped up or depressed.

From the rear side of the lower rail depend ears 76 carrying pintles 77, upon which is hinged a swinging frame comprising end bars 78, a rock shaft 79, a rod 80 and a rack bar 81. Column stops 82 are supported upon the rod 80 and engage the teeth of the rack bar. This swinging frame, it will be understood, is much longer than the swinging frame 41, at Fig. 5, and occupies the room formerly taken up by the detached blocks 33.

To remove the long carriage it is only necessary to take out the screw 62 and to catch hooks 83 over pins 84, Fig. 11, whereby the tracks 60, 61 are held together, against relative movement, and hence loss of the balls 64 is avoided. The upper track 60 is secured by means of screws 85 to lugs 86 formed upon the rear bar 87 of the long carriage, Fig. 11. For the long carriage is provided a long shift rail 88, which is formed in two sections joining at 89, said sections being hollow to telescope upon the short rail 8, each section being longitudinally slitted at 90 to clear the thin plate-like flanges 91, upon which the rail 8 is fixed, Figs. 8 and 17, said flanges being formed upon a rocking frame 9 comprising a rock shaft 93 journaled upon the main frame. Depending from the under side of the sections of the shift rail 88 are wide flanges or braces 94 having overlapping tongues 95 secured together by screws 96. Screws 97 also secure the sections of the rail 88 to the supporting rail 8.

When it is desired to change from a wide carriage to a short one, it is only necessary to take off the sections of the rail 88, and exchange the front and rear long rails for front and rear short rails and appurtenances, and mount the short carriage on them in the usual manner; and the operation may be reversed for changing from a short carriage to a wide carriage.

Variations may be resorted to within the scope of the invention, and portions of the improvements may be used without others.

Having thus described my invention, I claim:

1. A typewriting machine frame provided with removable blocks upon which is hinged a column-stop frame, and a carriage rail having ears whereby it is removably secured upon said blocks.

2. A typewriting machine frame provided with removable blocks, a carriage rail mounted upon said blocks, and a column-stop frame hinged upon said blocks.

3. A typewriting machine frame provided with removable blocks carrying both a hinged column-stop frame and a short carriage rail, and provided with seats for attachment thereto of a long carriage rail; the latter carrying bearings upon which is hinged a long column-stop frame to extend through the space made vacant by the removal of said blocks; whereby the machine frame may be changed from a short-rail to a long-rail frame at will.

4. A typewriting machine frame provided with seats upon which is removably secured a long carriage rail, bearings attached to said carriage rail, and a column-stop frame hinged to said bearings.

5. In a typewriting machine having a main frame, the combination of a rail detachably mounted upon said frame and having a ball groove, a carriage having a corresponding ball groove, balls in the grooves, three ears depending from the carriage and having anti-friction rolls to hook under said rail, said rolls being mounted one at each end and one at the middle of the carriage, and releasable means to connect the ends of the rail temporarily to the ends of the carriage, to retain the balls in the grooves and permit the rail, balls and carriage to be removed together from the machine frame.

6. A telescopic rail set for the shifting platen carriers of a typewriter frame, comprising a short rail of small diameter suitable for a short carriage, a long rail bored to fit upon the short rail, the long rail being formed in two sections, a frame whereon the short rail is mounted, and means for securing the sections upon the frame; each of said sections having a pendent stiffening flange or rib, said ribs overlapping and detachably secured together at their overlapping portions, and slitted to clear flanges whereon the short rail is secured.

7. A telescopic rail set for the shifting platen carriers of a typewriter frame, comprising a short rail of small diameter suitable for a short carriage, a long rail bored to fit upon the short rail, the long rail being formed in two sections a frame whereon the short rail is mounted, and means for securing the sections.

8. In a typewriting machine having a main frame, the combination of a rail detachably mounted upon said frame and having a ball groove, a carriage having a corresponding ball groove, balls in the grooves, an ear depending from the carriage to hook under said rail, and latches to connect the ends of the rail temporarily to the ends of the carriage, to retain the balls in the grooves and permit the rail, balls and carriage to be removed together from the machine frame.

9. In a typewriting machine having a main frame, the combination of a rail detachably mounted upon said frame and having a ball groove, a carriage having a corresponding ball groove, balls in the grooves, and latches to connect the ends of the rail temporarily to the ends of the carriage, to prevent relative movement of the rail and carriage, and retain the balls in the grooves and permit the rail, balls and carriage to be removed together from the machine frame.

10. A telescopic rail set for the shifting platen carriers of a typewriter frame, comprising a short rail of small diameter suitable for a short carriage, a long rail bored to fit upon the short rail, the long rail being formed in two sections, a frame whereon the short rail is mounted, and means for securing the sections, each of said sections having a pendent stiffening flange or rib, said ribs overlapping and detachably secured together at their overlapping portions.

11. A typewriting machine frame, interchangeable short and long front rails therefor, interchangeable short and long rear rails therefor, a short shift rail therefor, and a long shift rail securable upon the short shift rail, the whole forming a set, whereby the frame may be adapted for either short or wide carriages.

12. A typewriting machine frame, interchangeable short and long front rails therefor, interchangeable short and long rear rails therefor, and short and long shift rails therefor, the whole forming a set, whereby the frame may be adapted for either short or wide carriages; each of the short and long carriages having a single front roll, and means being provided upon the rear of the long carriage to prevent tipping up of either end thereof.

13. A typewriting machine frame, interchangeable short and long front rails therefor, interchangeable short and long rear rails therefor, and short and long shift rails therefor, the whole forming a set, whereby the frame may be adapted for either short or wide carriages; each of the short and long carriages having a single front roll, and means being provided upon the rear of the long carriage to prevent tipping up of either end thereof; said means comprising three wheels to run upon the under side of the rear rail at such intervals that at least two of the wheels are always working.

14. A typewriting machine frame provided with removable blocks upon which is hinged a column stop frame, a short carriage rail having ears to secure it upon said blocks, and a long carriage rail removably secured upon seats provided upon the typewriter frame, and carrying bearings on which is hinged a long column stop frame.

15. A typewriting machine set comprising a main frame having a short front rail detachably secured thereon, a short rear rail attached to the frame, a short shift rail mounted upon the frame, a short carriage movable on said front and rear rails and having a platen frame to run on said shift rail, said front and rear rails interchangeable respectively with a long front rail and a long rear rail, a long carriage to run upon the long rails, whereby either the long or the short carriage may be placed upon said frame; and a long shift rail formed in telescopic sections to fit upon the short shift rail.

HERMAN L. WAGNER.

Witnesses:
B. C. STICKNEY,
JOHN C. SEIFERT.